Oct. 31, 1961  H. M. VALENTINE ET AL  3,006,694
BRAKE CONTROL VALVE
Filed Jan. 30, 1959

INVENTORS
Harry M. Valentine and
Charles E. Gates
BY Scrivener and Parker
ATTORNEYS

… …

United States Patent Office 3,006,694
Patented Oct. 31, 1961

3,006,694
BRAKE CONTROL VALVE
Harry M. Valentine and Charles E. Gates, Elyria, Ohio, assignors to Bendix-Westinghouse Automotive Air Brake Company, Elyria, Ohio, a corporation of Delaware
Filed Jan. 30, 1959, Ser. No. 790,217
4 Claims. (Cl. 303—22)

This invention relates to automotive fluid pressure brake systems and more particularly to means for varying the braking force exerted on the vehicle wheels in accordance with the vehicle load.

An object of the invention is to provide in an automotive fluid pressure brake system an improved means for varying the braking force exerted by the brakes on a vehicle's wheels in accordance with the vehicle load.

More particularly it is an object of the invention to provide in an automotive fluid pressure braking system means for varying the relative braking forces exerted on the front and rear wheels of the vehicle.

Another object of the invention is to provide a load proportional braking system which utilizes the pressure in the bags of an air spring pressure suspension system for determining the applied braking force in proportion to the load on the vehicle.

It is still another object of the invention to provide in a fluid pressure braking system of the foregoing nature an improved valve means for regulating the applied braking force in accordance with vehicle load.

Figure 1:
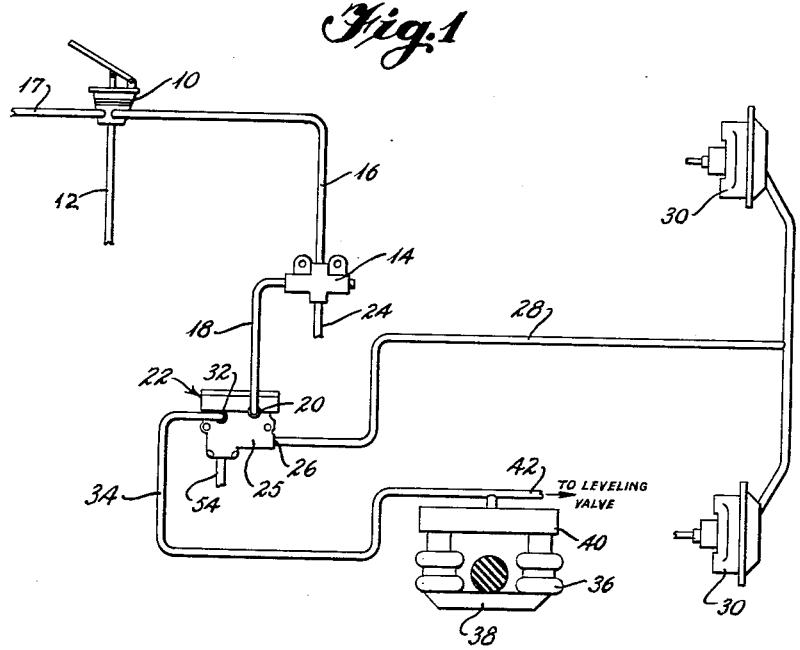
Figure 2:
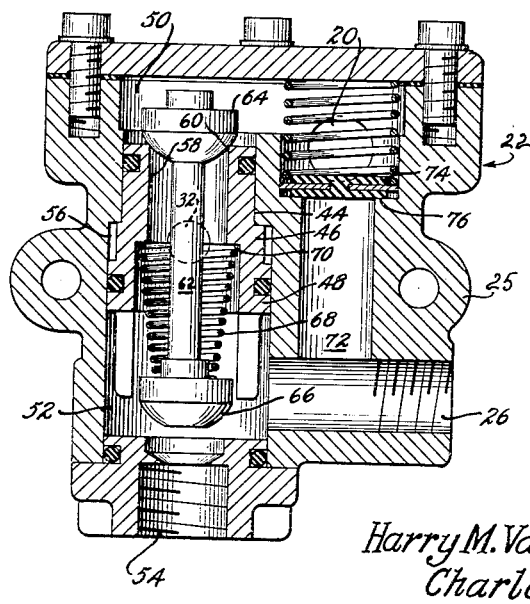

Other objects and their attendant advantages will become apparent as the following detailed description is read in conjunction with the accompanying drawings wherein:

FIG. 1 is a schematic view of an automotive fluid pressure brake system employing the features of the present invention; and FIG. 2 is a vertical cross-sectional view of a preferred embodiment of the proportioning valve used in the system of FIG. 1.

Referring now to FIG. 1, there is illustrated a fluid pressure braking system having a pedal operated brake valve 10, preferably of the self-lapping variety, which is connected by a conduit 12 to a source of fluid pressure (not shown) and on one side to a quick release valve 14 by means of a conduit 16 and on the other by means of a conduit 17 to the front brake chambers (not shown). The quick release valve 14 is connected by a conduit 18 to a port 20 of a proportioning valve 22 constructed in accordance with the invention and hereinafter described in detail. The quick release valve 14 may be of any well-known construction which permits fluid pressure in conduit 18 to be released to atmosphere through an exhaust 24 without returning to the brake valve 10.

The proportioning valve 22 comprises a body 25 which is connected through a port 26 and conduit 28 to conventional brake chambers 30 associated with the rear axles (not shown) of the vehicle. The valve 22 is also connected through a port 32 and conduit 34 with conventional air springs 36 disposed between an axle or unsprung part 38 of the vehicle and the chassis or sprung part 40 of the vehicle. The air spring 36 is adapted to be supplied with fluid pressure by means of a conduit 42 and a conventional leveling valve (not shown) which is responsive to vehicle loading to supply or exhaust fluid pressure to or from the air springs in accordance with changes in the load on the vehicle. It will be understood by those skilled in the art that when the vehicle load is decreased the springs 36 expand so as to move chassis 40 upwardly with respect to axle 38. This movement actuates a control lever connected to the leveling valve which is moved to exhaust position to release pressure in the springs 36 until the chassis is lowered to its predetermined height above the axle at which position the leveling valve is moved by the control lever to a lap position so that no further air is exhausted from the springs. Should the load be increased, the reverse of the above action would take place resulting in increased pressure in the air springs to raise the chassis upwardly to the above mentioned predetermined height above the axle.

The purpose of the valve 22 is to limit or control the air pressure delivered to the brake chambers in proportion to the vehicle load as determined by the pressure in the air springs. With particular reference to FIG. 2, it will be observed that the interior of the casing 25 is provided with a bore 44 adapted to slideably receive the smaller end of a double diameter valve actuating element or piston 46, an enlarged bore in the lower portion of the housing receiving an enlarged portion 48 of the piston. It will thus be apparent that the piston in cooperation with the casing divides the interior of the casing into a plurality of chambers, comprising an inlet chamber 50 connected with the inlet port 20 as shown, an outlet chamber 52 connected with the outlet port 26 and an exhaust port 54, and a third chamber 56 connected to the air springs via conduit and port 34, 32. The upper portion of the piston 46 is provided with a bore 58 connected to the outlet chamber 52 and adapted to be connected with the inlet chamber 50 by means of a port 60 formed at the upper end of the bore 58. Valve mechanism for controlling the port 60 and the exhaust port 54 includes a valve member 62 having an inlet valve 64 at its upper end and an exhaust valve 66 at the lower end, the inlet valve being normally held in a position to close the port 60 by means of a valve spring 68 interposed between a shoulder 70 in bore 58 and the exhaust valve. The valve member 62 is of such a length that the valve 66 is spaced from the upper end of the exhaust port 54 when the piston is at the upper end of its travel, though as will become more fully apparent hereinafter, the piston normally occupies its lower position as a result of the air spring pressure normally in the chamber 56. With the piston in its lower position, the exhaust valve 66 closes the exhaust port 54 and inlet valve 64 is opened to connect inlet chamber 50 with outlet chamber 52 so that conduits 16, 18 and conduit 28 are normally in open communication and remain in open communication until a predetermined relationship between brake chamber and air spring pressure has been established as will become fully apparent.

Assuming now that the vehicle is lightly loaded so that 12 p.s.i. exist in the air springs and the operator moves the brake pedal to effect a 10 p.s.i. brake valve delivery pressure. Upon this occurrence and assuming also that only the rear brake chambers are provided with the proportioning valve of the invention, 10 p.s.i. pressure is supplied to the front brake chambers and also to the inlet chamber 50 of the proportioning valve. However, since the inlet valve is normally open and the exhaust valve normally closed, this same pressure will also be supplied to the rear brake actuators through inlet port 60, outlet chamber 52 and conduit 28. With the control chamber 56 connected to the 12 p.s.i. pressure in the air springs, it will be apparent that on the establishment of the 10 p.s.i. pressure in both the inlet and outlet chambers of the valve, the forces acting in opposite directions on the piston 58, due to fluid pressure acting on the opposing ends on areas equal to that of the smaller end, will be equal while a downward force will be exerted on the piston due to the action of the difference in fluid pressure across the annular area corresponding to that presented by the piston to the control pressure in the chamber 56. Since it has been assumed that the air spring or control pressure is 12 p.s.i. and the brake valve delivery pressure is 10 p.s.i., it will be apparent that the total forces acting downwardly on the piston are greater than the forces acting upwardly and that the piston remains in its normal position and 10 p.s.i. pressure is applied to the rear brake chambers as if the valve 22 did not exist in the system.

Assume now that the operator depresses the brake pedal to an amount which delivers 15 p.s.i. pressure. As before this pressure is delivered to the front brake chambers and to the inlet chamber 50 of the valve 22, from whence the pressure flows via the open inlet valve 64 to the rear brake chambers. Disregarding friction losses and the force of spring 68, which is a relatively light spring whose force is negligible, when pressure on the opposed ends of piston 46 is equal, the total force exerted on the area thereof in the outlet chamber equal to the area in the control chamber, is greater than the downward force exerted by the pressure in the control chamber and the piston 48 thus moves upwardly with respect to valve mechanism 62 until the latter assumes a lapped position and valves 64, 66 are closed. A further increase in the outlet chamber cannot be effected until the pressure in the inlet chamber is increased to a point where the total downward force exceeds the upward force by an amount greater than that acting on the area of the lower end of the piston opposing the area of the control chamber. When the pressure in the inlet chamber does rise to this point, the piston is moved downwardly to open port 60 and immediately thereafter the piston is moved upwardly to close the inlet valve before the pressure in the outlet chamber can increase to a value equal to that in the inlet chamber. Thus, regardless of the amount of the pressure delivered by the brake valve to the inlet chamber of the valve, the outlet pressure will always be less than the inlet pressure provided the inlet pressure is greater than the air spring pressure in the control chamber 56, and at pressures above this latter pressure the respective pressure at opposite ends of the piston will be in inverse proportion to the areas of the piston at those ends.

From the foregoing it should be apparent that when the vehicle is heavily loaded so that the air spring pressure is increased, the valve will perform exactly as described in the foregoing paragraphs except that the valve inlet and outlet pressure must exceed the higher air spring pressure before, upon a further increase in brake valve pressure, less pressue is delivered to the brake chambers than to the valve inlet chamber 50.

On operation of the brake valve to effect a release of fluid pressure from the front brake chambers, the corresponding reduction of pressure in the inlet chamber 50 of the valve 22 will unbalance the opposing forces acting on the piston, allowing the pressure in the outlet chamber 52 acting on the lower face of the piston to move the piston upwardly, thus moving the exhaust valve 66 upwardly away from the exhaust port and permitting the escape of air from the rear brake chambers to atmosphere until the pressures acting on the differential piston areas are again balanced and the valve mechanism laps.

As the brake pedal is moved towards its release position, it is possible for the downward force in the control chamber to balance the upward force in the outlet chamber 52 so that the valve mechanism laps with the pressure in the inlet chamber 50 being less than the pressure in the outlet chamber 52. Under these conditions, it is desirable that the pressure on both ends of the piston be equalized and to this end a connection is provided between the inlet and outlet chambers which includes a passage 72 formed in the casing, communication therethrough between chambers 50, 52 being prevented by means of a spring pressed check valve 74 normally seated on a suitable valve seat 76 at the upper end of the passage 72. With this arrangement pressure slightly in excess of the seating force of the valve spring is sufficient to lift the valve and permit the pressures in the respective chambers 50, 52 to equalize.

From the foregoing description, it will be apparent that the present invention provides a novel differential braking system responsive to load conditions on a vehicle to provide differential braking between front and rear axles with uniform braking pressure being applied to all brake chambers equally until such a time as a predetermined relationship has been established between applied braking pressure and the load, with this relationship being established by the pressure in the air springs of a vehicle. Thus the invention limits the braking force which may be applied during severe brake application or during brake applications that are in excess of that required for the vehicle under a particular load condition.

The system shows and describes the use in the system of a quick release valve. This is not necessary to the operation of the invention but is desirable for quick release of brake pressure when it is relatively low, that is to say, less than the air spring pressure under which conditions the valve of the invention performs no functions as explained above.

The present invention has been described in its use with limiting the brake pressure in a vehicle's rear axle. It will be apparent that the present invention is not limited to such use but can be utilized in any desired combination with any of the axles of a single vehicle or of a tractor-trailer combination. In addition, various changes and modifications can be resorted to in the valve without, however, departing from the scope and spirit of the appended claims.

What is claimed is:

1. In combination with a vehicle having air springs and means for controlling the pressure in the air springs in proportion to vehicle loading, a braking system including a brake valve, brake actuators and a proportioning valve mechanism connected between said brake valve and said actuators, said proportioning valve comprising a casing having an inlet port connected to said brake valve, an outlet port connected to said actuators, and a control port connected to said air springs, said valve mechanism being adapted to maintain the pressure supplied to the outlet port through the valve mechanism at a value less than but proportional to the pressure supplied to the inlet port whenever the pressure at said outlet port exceeds the pressure at said control port, said mechanism including an inlet valve in the casing for connecting and disconnecting said inlet and outlet ports and a pressure responsive element for operating said valve having an area responsive to the inlet pressure, a greater area responsive to the outlet pressure, and a third area equal in value to the difference between the first two areas and responsive to the pressure at said control port.

2. In combination with a vehicle having air springs, means for controlling the pressure in the air springs in proportion to vehicle loading, a braking system including a brake valve, brake actuators and a proportioning valve mechanism connected between said brake valve and said actuators, said proportioning valve comprising a casing having an inlet port connected to said brake valve, an outlet port connected to said actuators, a control port connected to said air springs, and an exhaust port, said valve mechanism being adapted to maintain the pressure supplied to the outlet port through the valve mechanism at a value less than but proportional to the pressure supplied to the inlet port whenever the pressure at said outlet port exceeds the pressure at said control port, said mechanism including inlet and exhaust valves in the casing for alternately connecting the inlet and outlet ports and the outlet and exhaust ports and a pressure responsive element for operating the valves having an area responsive to the inlet pressure, a greater area responsive to the outlet pressure, and a third area equal in value to the difference between the first two areas and responsive to the pressure at said control port.

3. In combination with a vehicle having air springs and means for controlling the pressure in the air springs in proportion to vehicle loading, a braking system including a brake valve, brake actuators and a proportioning valve mechanism connected between said brake valve and said actuators, said proportioning valve comprising a casing having an inlet port connected to said brake valve, an outlet port connected to said actuators, a control port connected to said air springs and an exhaust port, valve means in said casing adapted for serially and alternately connecting said inlet and outlet ports and for connecting said outlet and exhaust ports in response to variations in the pressures supplied to said inlet and control ports, a valve actuating element responsive jointly to inlet and outlet port pressures for controlling the operation of said valve means and having a portion of its area responsive to air spring pressure supplied to said control port whereby said element is actuated to close both valves when the pressure at the outlet port is less than the pressure at the inlet port by a predetermined ratio, means for varying the air spring pressure in proportion to vehicle loading so that the pressure supplied to said control port is a function of vehicle loading whereby said element is actuated to maintain the valves in closed position when the control, inlet and outlet ports are substantially balanced.

4. The combination of claim 3 including other port means connecting said inlet and outlet ports, one-way check valve means normally closing said other port means to prevent the flow of fluid pressure from said inlet to said outlet port but permitting flow in the opposite direction whereby the pressure at said inlet and outlet ports may be substantially equalized when the outlet port pressure is greater than the inlet port pressure.

References Cited in the file of this patent

UNITED STATES PATENTS

| | | |
|---|---|---|
| 1,809,069 | Sanford | June 9, 1931 |
| 2,150,576 | Bell | Mar. 14, 1939 |
| 2,406,284 | Fitch | Aug. 20, 1946 |
| 2,807,338 | Jankauskas | Sept. 24, 1957 |